Patented Mar. 8, 1927.

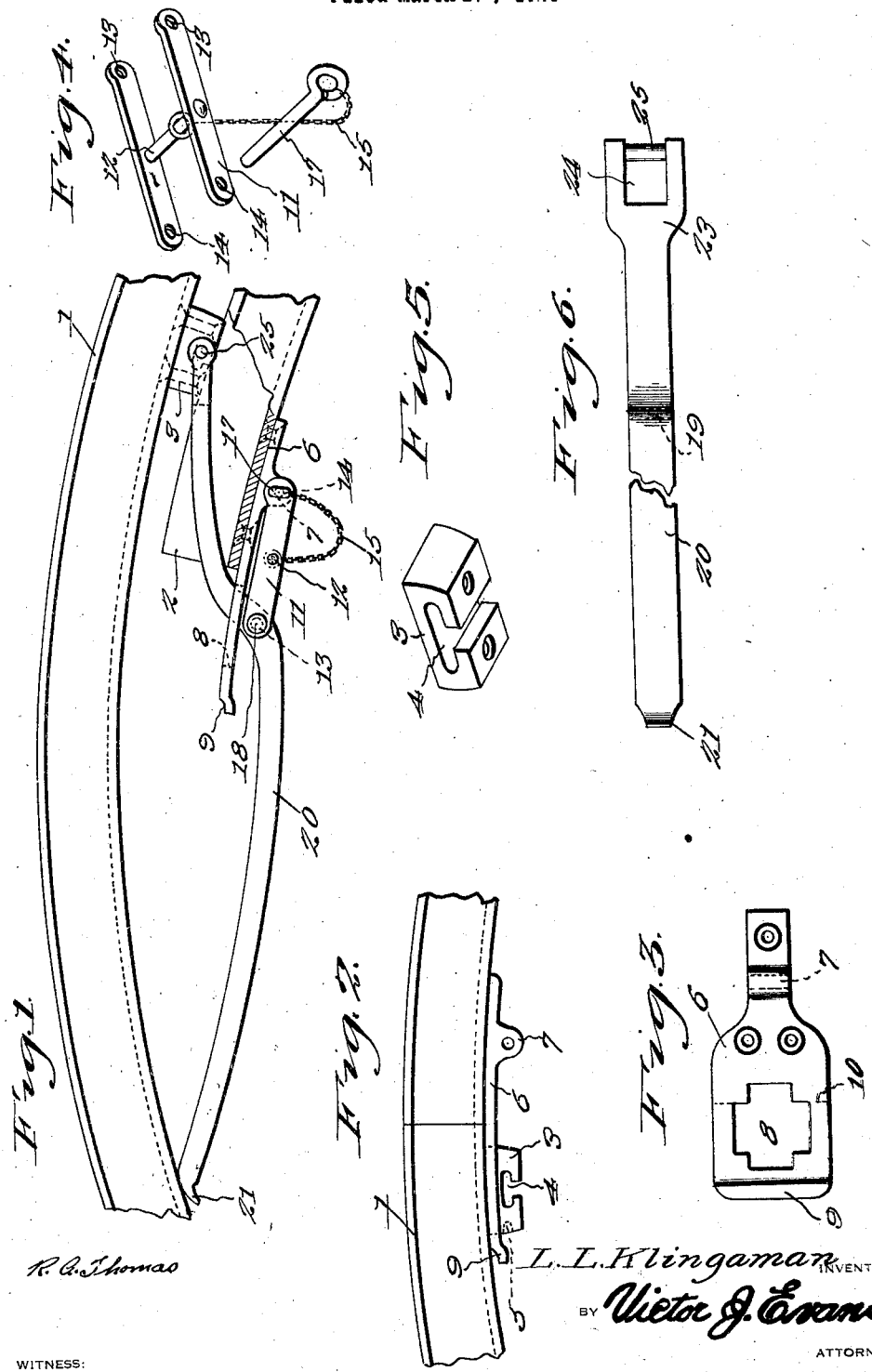

1,620,470

UNITED STATES PATENT OFFICE.

LLOYD L. KLINGAMAN, OF KELSO, WASHINGTON.

ACTUATING ATTACHMENT FOR RIMS.

Application filed March 17, 1926. Serial No. 95,398.

My present invention has reference to a means for expanding or contracting split tire carrying rims and for effectively holding said rims in either of such positions, and my object is to simplify and cheapen the construction of actuating attachment for rims set forth in my copending application filed Nov. 16, 1925, and bearing Serial No. 69,424.

Other objects and advantages will present themselves when the following description is carefully read in connection with the accompanying drawings.

In the drawings:

Figure 1 is a side elevation showing a split rim contracted in accordance with this invention, parts being in section.

Figure 2 is a similar view showing the rim expanded and the sections thereof locked together.

Figure 3 is a plan view of the plate or bracket.

Figure 4 is a perspective view of the removable locking members.

Figure 5 is a similar view of the lug employed.

Figure 6 is a plan view of the actuating lever.

In the main my construction is very similar to my referred to copending application Serial No. 69,424, filed by me Nov. 16, 1925. In my copending application, all of the parts constituting the improvement remain permanently a fixture of the split rim. In reducing my improvement to practical use I have found it desirable to removably associate the actuating lever, etc., with the remainder of the construction as this renders the improvement more readily applicable to old as well as new rims. Also it will be noted that the details of my present application vary from those set forth in my copending application.

Referring now to the drawings in detail, the numerals 1 and 2 designate the ends of a split tire carrying rim. Of course, the rim being of metal embodies an inherent resiliency.

On the under face of the plate 1 I rivet or otherwise secure a lug 3, best illustrated in Figure 5. The lug has a transverse substantially T-shaped slot 4 therethrough and has one of its ends provided with a depression 5. Riveted or otherwise secured on the under face of the rim end 2 there is a flat plate or bracket 6. The reduced body portion of this plate or bracket is formed with a transversely arranged depending ear 7, having a suitable opening therethrough, and the outer portion of the plate or bracket is widened and formed with a cross-shaped opening 8 and with an offset lip 9 outward of the said opening 8. If desired, the plate or bracket may be cut on the dotted line 10 in Figure 3 of the drawings in which event the outer edge of the said plate is notched and the lip 9 is dispensed with.

In order to connect the operating lever to the end of the rim I provide a pair of links 11 arranged in spaced parallel relation and centrally connect it by cross bar 12. These links 11 are each provided at one end with an opening 13 and at the other end with an opening 14, the opening 14 being designed to receive the pivot 18 which pivotally connects the links to the offset portions of the operating lever and a flexible element 15 is connected to the cross bar 12 and carries at its outer end a pin 17 which is designed to be passed through the openings 13 and through an opening in the ear as disclosed in Figure 1. The offset portion of the lever 20 is provided with the opening 19 for receiving the pivot pin 18.

The operating lever has one of its ends formed with a reduced portion in the nature of a tooth 21, and its opposite end widened, as at 23, notched as at 24 and provided in the notch with a cross bar 25. The cross bar is designed to be received in the T-shaped opening in the lug 3, and when the parts are associated as above described a pull on the outer end of the lever will expand the rim so that the ends thereof may be brought into frictional engagement. When this is accomplished the lug 3 will be received through the opening 8 in the plate or bracket 6. To firmly lock the plate or bracket on the lug suitable means, such for instance as the end 21 of the actuating lever, is brought into the depression 5 of the lug and pressed against the lip 9 of the bracket 6. In a like manner this end of the actuating lever is brought between the lip and the under face of the tire end 1 when the bracket is to be removed from the lug and the tire rim is contracted, as shown in Figure 1 of the drawings. The contracting of the tires is also accomplished by the actuating of the lever but in a reverse direction to that just described.

After the rim ends have been brought into contacting engagement, the actuating lever 20 and the fulcrum member 11 are detached, so that only the interengaging bracket and lug remain permanently on the ends of the rim, and it is believed that the foregoing description when taken in connection with the drawings will fully set forth the simplicity and advantages of my construction.

Having described the invention, I claim:—

A tire expanding device including an operating lever formed at its intermediate portion with oppositely disposed curved portions, one end of said lever being enlarged and longitudinally notched to form spaced ears, a cross bar connecting said ears, a pair of spaced parallel arranged links having one of their ends pivotally connected to the lever between the oppositely disposed curved portions, a cross bar connecting said links and permanently retaining them in equal spaced relation, a removable pin for insertion into the end of either link opposite its pivoted end and means connecting said pin with the cross bar to prevent accidental loss of same.

In testimony whereof I affix my signature.

LLOYD L. KLINGAMAN.